United States Patent
Miller et al.

(10) Patent No.: US 9,396,510 B2
(45) Date of Patent: *Jul. 19, 2016

(54) WATERMARKING DIFFERENT AREAS OF DIGITAL IMAGES WITH DIFFERENT INTENSITIES

(71) Applicant: Digimarc Corporation, Beaverton, OR (US)

(72) Inventors: Marc D. Miller, Corte Madera, CA (US); Donald Haaga, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,777

(22) Filed: Sep. 10, 2013

(65) Prior Publication Data

US 2014/0010404 A1    Jan. 9, 2014

Related U.S. Application Data

(60) Continuation of application No. 13/711,282, filed on Dec. 11, 2012, now Pat. No. 8,532,335, which is a continuation of application No. 13/284,503, filed on Oct. 28, 2011, now Pat. No. 8,331,613, which is a (Continued)

(51) Int. Cl.
| G06K 9/00 | (2006.01) |
| G06T 1/00 | (2006.01) |
| H04N 1/32 | (2006.01) |

(52) U.S. Cl.
CPC ............. *G06T 1/0028* (2013.01); *G06T 1/0092* (2013.01); *H04N 1/32203* (2013.01); *H04N 1/32208* (2013.01); *H04N 1/32229* (2013.01);

(Continued)

(58) Field of Classification Search
USPC ........................................... 382/100; 713/106
See application file for complete search history.

(56) References Cited

U.S. PATENT DOCUMENTS

| 4,231,656 A | 11/1980 | Dickey et al. |
| 4,649,435 A | 3/1987 | Kramer |

(Continued)

FOREIGN PATENT DOCUMENTS

| EP | 0961239 | 12/1999 |
| GB | 2346110 | 1/2000 |
| WO | WO 9743736 | 11/1997 |

OTHER PUBLICATIONS

Kankanhalli, Content Based Watermarking of Images, Proceedings of the sixth ACM international conference on Multimedia, 1998.

(Continued)

*Primary Examiner* — John Strege
(74) *Attorney, Agent, or Firm* — Digimarc Corporation

(57) ABSTRACT

The disclosure relates to data hiding and digital watermarking in imagery. One claim recites an apparatus comprising: memory storing an image editing program; an input for receiving imagery, the imagery comprising image features that vary across the imagery; a processor configured for: encoding a pattern of 2-dimensional auxiliary data at a first intensity within a first multi-dimensional region within the imagery; and encoding the pattern of 2-dimensional auxiliary data at a second, different intensity within a second multi-dimensional region within the imagery. Of course, other claims and combinations are provided.

34 Claims, 7 Drawing Sheets

Related U.S. Application Data continuation of application No. 12/758,600, filed on Apr. 12, 2010, now Pat. No. 8,050,450, which is a division of application No. 11/295,345, filed on Dec. 5, 2005, now Pat. No. 7,697,716, which is a continuation of application No. 09/649,260, filed on Aug. 28, 2000, now abandoned.

(60) Provisional application No. 60/152,520, filed on Sep. 1, 1999.

(52) U.S. Cl.
CPC ....... *H04N 1/32251* (2013.01); *H04N 1/32261* (2013.01); *G06T 2201/0061* (2013.01)

(56) References Cited

U.S. PATENT DOCUMENTS

| | | | |
|---|---|---|---|
| 5,315,098 A | 5/1994 | Tow | |
| 5,412,742 A | 5/1995 | Takasaki et al. | |
| 5,528,740 A | 6/1996 | Hill et al. | |
| 5,530,759 A | 6/1996 | Braudaway et al. | |
| 5,537,223 A | 7/1996 | Curry | |
| 5,613,004 A | 3/1997 | Cooperman | |
| 5,617,119 A | 4/1997 | Briggs et al. | |
| 5,734,752 A | 3/1998 | Knox | |
| 5,790,703 A | 8/1998 | Wang | |
| 5,822,436 A | 10/1998 | Rhoads | |
| 5,825,892 A | 10/1998 | Braudaway et al. | |
| 5,862,260 A | 1/1999 | Rhoads | |
| 5,893,101 A | 4/1999 | Balogh et al. | |
| 5,901,178 A | 5/1999 | Lee et al. | |
| 5,905,800 A | 5/1999 | Moskowitz | |
| 5,930,369 A | 7/1999 | Cox | |
| 5,945,103 A | 8/1999 | Hanada et al. | |
| 5,946,414 A | 8/1999 | Cass et al. | |
| 5,951,055 A | 9/1999 | Mowry, Jr. | |
| 6,031,914 A | 2/2000 | Tewfik et al. | |
| 6,122,403 A | 9/2000 | Rhoads | |
| 6,128,411 A | 10/2000 | Knox | |
| 6,141,441 A | 10/2000 | Cass et al. | |
| 6,181,802 B1 | 1/2001 | Todd | |
| 6,205,249 B1 | 3/2001 | Moskowitz | |
| 6,208,735 B1 | 3/2001 | Cox et al. | |
| 6,208,746 B1 | 3/2001 | Musgrave | |
| 6,222,932 B1 | 4/2001 | Rao | |
| 6,252,971 B1 | 6/2001 | Wang | |
| 6,272,176 B1 | 8/2001 | Srinivasan | |
| 6,272,260 B1 | 8/2001 | Furukawa et al. | |
| 6,281,903 B1 | 8/2001 | Martin | |
| 6,334,187 B1 | 12/2001 | Kadono | |
| 6,345,104 B1 | 2/2002 | Rhoads | |
| 6,370,272 B1 | 4/2002 | Shimizu | |
| 6,381,341 B1 | 4/2002 | Rhoads | |
| 6,384,935 B1 | 5/2002 | Yamazaki | |
| 6,404,908 B1 | 6/2002 | Schneider et al. | |
| 6,449,377 B1 | 9/2002 | Rhoads | |
| 6,556,688 B1 | 4/2003 | Ratnakar | |
| 6,603,576 B1 | 8/2003 | Nakamura | |
| 6,631,198 B1 | 10/2003 | Hannigan et al. | |
| 6,633,654 B2 | 10/2003 | Hannigan et al. | |
| 6,700,995 B2 | 3/2004 | Reed | |
| 6,778,678 B1 | 8/2004 | Podilchuk | |
| 6,856,429 B1 | 2/2005 | Noguchi | |
| 6,879,701 B1 | 4/2005 | Rhoads | |
| 6,985,600 B2 | 1/2006 | Rhoads et al. | |
| 6,987,862 B2 | 1/2006 | Rhoads | |
| 7,020,349 B2 | 3/2006 | Brunk | |
| 7,050,603 B2 | 5/2006 | Rhoads et al. | |
| 7,113,614 B2 | 9/2006 | Rhoad | |
| 7,286,684 B2 | 10/2007 | Rhoads et al. | |
| 7,697,716 B2 | 4/2010 | Miller et al. | |
| 8,050,450 B2 | 11/2011 | Miller et al. | |
| 8,190,901 B2 | 5/2012 | Barr et al. | |
| 8,213,674 B2 | 7/2012 | Hannigan et al. | |
| 8,331,613 B2 | 12/2012 | Miller et al. | |
| 8,532,335 B2 | 9/2013 | Miller et al. | |
| 8,788,971 B2 | 7/2014 | Rhoads | |
| 2001/0030769 A1 | 10/2001 | Jacobs | |
| 2001/0052076 A1 | 12/2001 | Kadono | |
| 2002/0054356 A1 | 5/2002 | Kurita et al. | |

OTHER PUBLICATIONS

Kutter, "Watermarking resisting to translation, rotation, and scaling," Proc. SPIE vol. 3528: Multimedia Systems and Applications, pp. 423-431, Nov. 1998.

Meng, Embedding Visible Video Watermarks in the Compressed Domain, Proc. IEEE Int. Conference in Image Processing, 1998.

Huang et al., Adaptive image watermarking scheme based on visual masking, 1998, IEEE Electronic letters.

Huang, et al., "Adaptive image watermarking scheme based on visual masking," IEEE Electonic Letters, Apr. 1998, vol. 34, Issue 8, pp. 748-750.

Bender, "Application for Data Hiding", IBM Systems Journal, vol. 39, No. 3.4, 2000, pp. 547-568.

IBM DataHiding Proposal, Version 1.0, Sep. 1997.

Podilchuk et al., "Adaptive Watermarking Using Visual Models," IEEE Journal on Selected Areas in Communications, 16(4), May 1998.

Cox, et al., "Secure Spread Spectrum Watermarking for Multimedia," IEEE Trans. Image Process, 1997, 6, (12), pp. 1673-1687.

Dec. 1, 2009 Notice of Allowance, Nov. 4, 2009 Amendment, Aug. 4, 2009 non-final Office Action, May 11, 2009 Amendment, Mar. 12, 2009 final Office Action, Dec. 15, 2008 Amendment with RCE, Sep. 15, 2008 non-final Office Action, Jun. 13, 2008 Amendment, Mar. 18, 2008 non-final Office Action, all from assignee's U.S. Appl. No. 11/295,345 (issued as U.S. Pat. No. 7,697,716).

Oct. 2, 2006 Notice of Abandonment, Jun. 6, 2005 Final Office Action, Feb. 28, 2005 Amendment, and Oct. 12, 2004 Non-Final Office Action, all from assignee's U.S. Appl. No. 09/649,260, filed Aug. 28, 2000 (abandoned).

WATERMARKING DIFFERENT AREAS OF DIGITAL IMAGES WITH DIFFERENT INTENSITIES

RELATED APPLICATION DATA

This application is a continuation of application Ser. No. 13/711,282, filed Dec. 11, 2012 (now U.S. Pat. No. 8,532,335), which is a continuation of application Ser. No. 13/284,503, filed Oct. 28, 2011 (now U.S. Pat. No. 8,331,613), which is a continuation of application Ser. No. 12/758,600, filed Apr. 10, 2010 (now U.S. Pat. No. 8,050,450), which is a division of application Ser. No. 11/295,345, filed Dec. 5, 2005 (now U.S. Pat. No. 7,697,716), which is a continuation of application Ser. No. 09/649,260, filed Aug. 28, 2000, now abandoned, which is a non-provisional of application 60/152,520, filed Sep. 1, 1999.

TECHNICAL FIELD

The present technology relates to steganography, and more particularly to techniques for watermarking digital images.

BACKGROUND AND SUMMARY

The technology for watermarking digital images is well developed. The intensity of the watermark determines both if the watermark will create visual artifacts and how easily the watermark will be to detect after an image has been printed, copied or otherwise transformed. When inserting a digital watermark into an image, it is desirable to utilize a high intensity watermark signal, that is, to change the intensity of the pixels in the image as much as possible so that it will be easy to detect and read the watermark. However, if the intensity of the watermark signal is too high, the watermark may create visual artifacts in the image, that is, the watermark signal may be visually evident.

Many watermarking technique are "perceptually adaptive." Perceptually adaptive watermarking techniques take into account the characteristics of an image in an effort to make a watermark relatively easy to detect and to avoid causing visually apparent artifacts in the watermarked image.

A perceptually adaptive watermarking technique is for example shown in U.S. Pat. No. 5,748,763 entitled "Image Steganography System Featuring Perceptually Adaptive and Globally Scalable Signal Embedding" by Geoffrey B. Rhoads. Certain commercially available image editing programs (such as the image edition program marketed by Adobe Corporation under the trademark "Adobe Photoshop") can watermark digital images using perceptually adaptive techniques.

The technology detailed herein concerns watermarking an image using the highest practical watermark intensity that can be used without creating visual artifacts. An image is divided into areas. Each area only contains portions of the image where it is appropriate to use a watermark signal having the same energy level.

Some images consist of a series of lines. Such images are often used as the background image on security documents or currency. If an image consists of a series of lines, the technology described herein can be applied by dividing the image into areas where the lines that form the image are within a certain range of widths. An appropriate watermark intensity is then determined for each such area and a watermark of this intensity is applied to the image. Watermarks can be applied to such images using the line width modulation techniques shown in U.S. application Ser. No. 09/074,034, filed May 6, 1998 (now U.S. Pat. No. 6,449,377) which corresponds PCT/US99/08252; and Ser. No. 09/127,502, filed Jul. 31, 1998 (now U.S. Pat. No. 6,345,104) which corresponds to PCT/US99/14532.

If an image is a grayscale image, areas having the same tonal value or tonal density are determined directly, or the image is transformed into a line art image and areas with the same size binary valued areas (lines, dots, squares, etc.) are selected by filtering the image.

After the image has been divided areas which have a line width or tonal density value that is within a certain range of values, an appropriate watermark energy level is assigned to each area. The image is watermarked by changing the value of each bit or pixel in the image by an amount determined by both the value in a payload tile and the intensity value associated with the area in which the bit or pixel lies.

The described technology is applicable to watermarking techniques which change the value of a binary parameter in areas of an image (for example, by modulating the width of lines in a line image) or to watermarking techniques which change the value of a multi-valued parameter in areas of the image (for example, by changing the luminance value of the pixels in an image).

DETAILED DESCRIPTION OF A PREFERRED EMBODIMENT

In a first preferred embodiment, the technology is applied to an image which consists of a series of lines. Images which consist of a series of lines are, for example, often found as background imagery on security documents and on currency. A digital watermark can be inserted into such an image using line width modulation techniques such as those shown in co-pending U.S. patent application Ser. No. 09/074,034, filed May 6, 1998 (now U.S. Pat. No. 6,449,377) which corresponds PCT/US99/08252, and Ser. No. 09/127,502, filed Jul. 31, 1998 (now U.S. Pat. No. 6,345,104) which corresponds to PCT/US99/14532. The disclosures of the above referenced patent applications is incorporated herein in their entireties A typical image which consists of a series of lines will have a relatively complex set of lines; however for ease of explanation the technology will herein be described as applied to a very simple image. This technology can be applied to complex images in exactly the same was as described herein as applied to a simple image.

Figure 1:
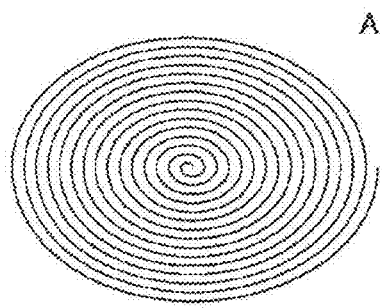
FIG. 1 shows three areas each of which have lines of different width.
Figure 1:
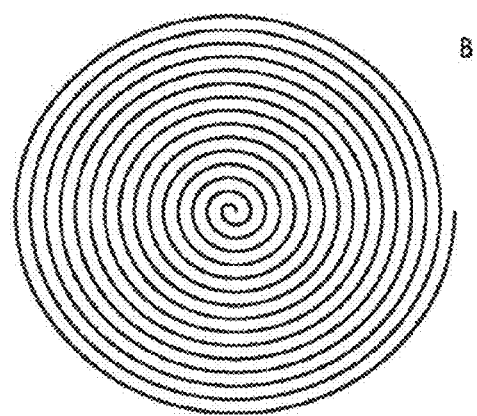
Figure 1:
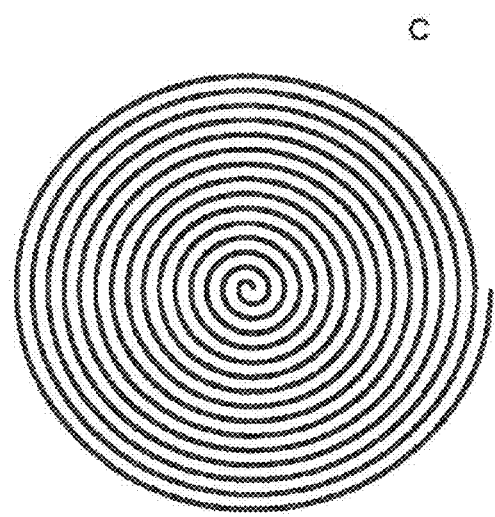

FIG. 1 shows three areas designated A, B, and C. Each of the areas A, B, and C has lines with a width that differs from the width of the lines in the other areas. The lines in area A are relatively narrow, the lines in area C are relatively wide, and the lines in area B have an intermediate width. Area C can absorb much more watermarking energy than can area A without creating any visual artifacts.

For ease of reference the line width in the three areas (in terms of pixels and resolution) will hereinafter be referred to by line width index numbers as follows:

Area A—0.5
Area B—1.0
Area C—2.0

The actual width of the lines in terms of pitch or pixel width will depend upon the specific application. For example, an index number of 1.0 could for example correlate to a pitch of 2. The relative width of the lines and this relative width can be most easily represented in a general manner by using index numbers.

Figure 2:
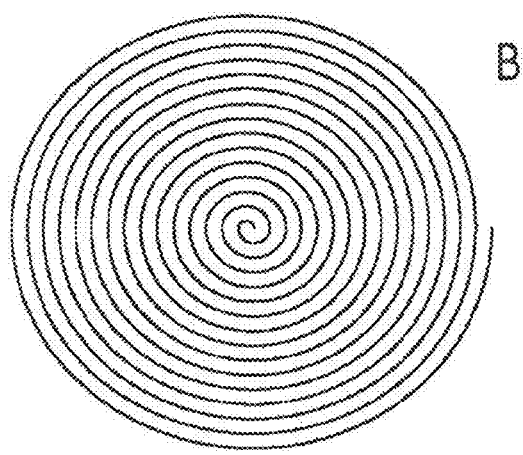
FIG. 2 shows an image after a mask has been applied
Figure 2:
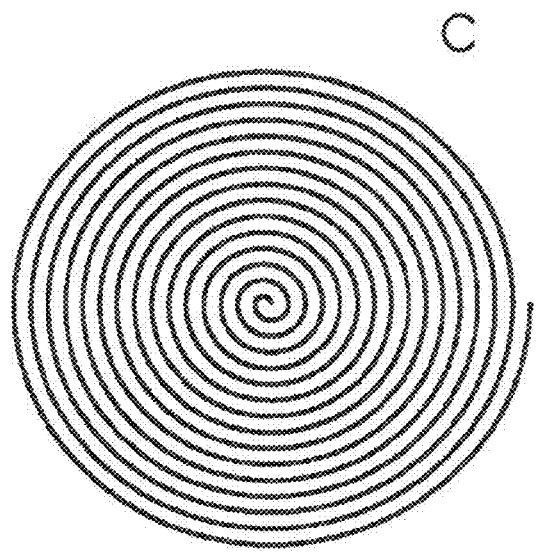

Many commercially available image editing programs (such as, for example, Adobe Photoshop) include the ability to make image filters, and masks. For example, using such programs an image can be filtered to eliminate all lines that have (in terms of the above line width index values) a width of less than 1.0. If such a filter is applied to the image shown in FIG. 1, area A would be eliminated, resulting in an image such as that shown in FIG. 2 which only has areas B and C. The image in FIG. 2 could then be subtracted from the image shown in FIG. 1 to produce an image (or mask) that only includes the image in area A. Next the image could be filtered to remove all lines with a line width index of less than 2.0. The result would be an image with only area C. The image with area C could be subtracted from the image with areas B and C to produce an image with only area B. One would thus have three images (or masks) each of which include lines with a particular line width index, that is, each of which specify an area which should be watermarked at a particular intensity.

It is desirable to watermark the three areas in the original image (each of which is defined by a different mask) with the maximum watermark energy without creating visual artifacts. The three masks described above can be used to control the watermarking operation as described below.

Figure 3:
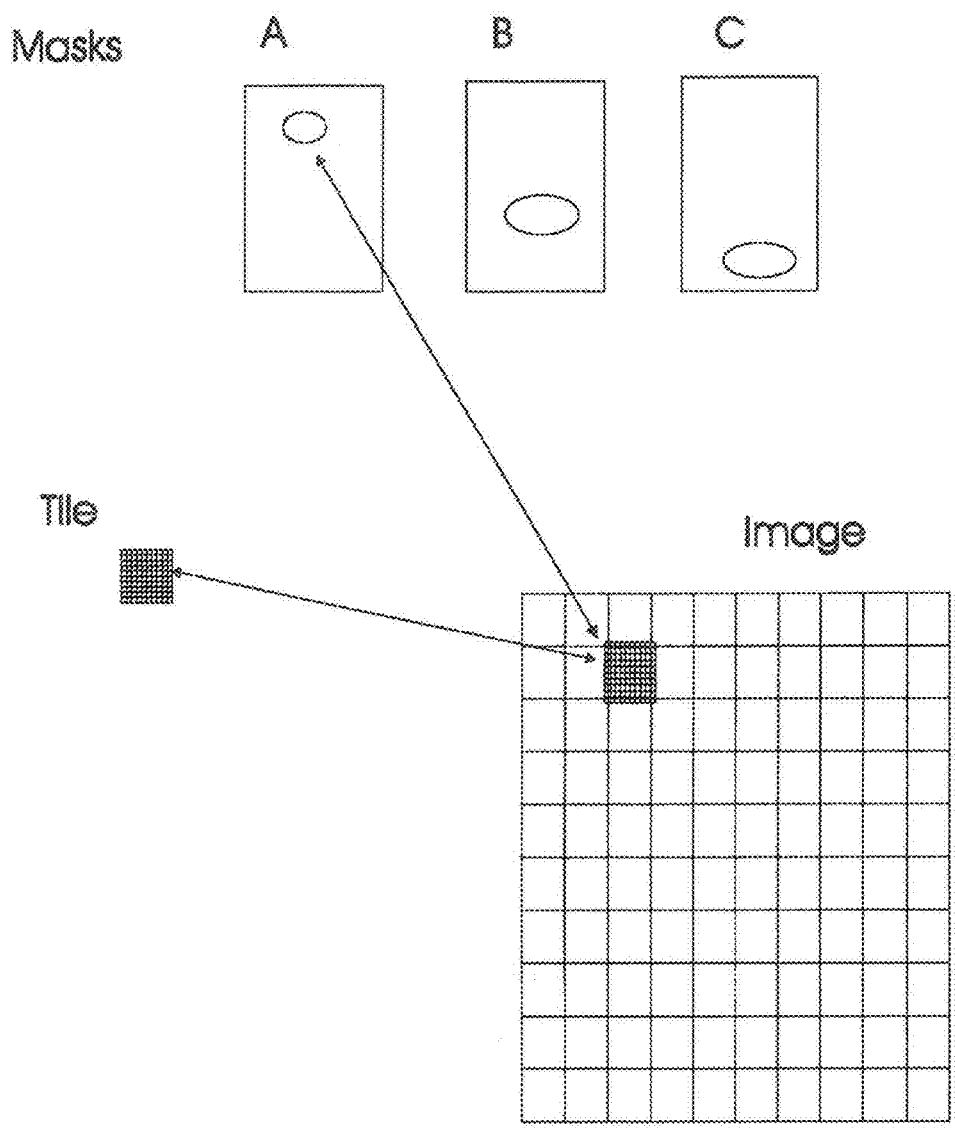
FIG. 3 shows an image divided into a grid.

As is conventional, in order to achieve reliability the image is divided into a grid as shown in FIG. 3. Each square in the grid will be x pixels on each side and thus each square will consist of $x^2$ pixels. The watermark data is inserted into each of the squares on the grid. The watermark data (termed the payload) is specified by a payload tile. The payload tile defines an amount of change for each pixel in the tile. The size of the tile is the same size as the size of the squares in the grid on the image, that is, in the example given the payload tile will have $x^2$ pixels. The tile specifies a relative amount of change for each pixel in a square on the image that will result in a particular watermark payload. The value of the changes specified by the payload tile are calculated using watermarking techniques such as those described in the previously referenced patent and patent applications. In prior watermarking techniques the pixels in each square of the grid on the image are changed in accordance with the amounts specified in the payload tile in order to watermark the image.

However, with this technology, when changing the pixels in the image in accordance with the payload tile, an additional intensity factor can be taken into account. For example, in a particular square on the grid, the pixels in the square may only be changed by one half of the amount specified in the payload tile. In another square on the grid, the pixels may be changed by seventy five percent of the amounts specified in the payload tile. That is, a watermark can be inserted into the image by changing each pixel in the image by an amount specified by an associated pixel in a payload tile, as modified by an intensity factor. The intensity factor for each pixel in the image is specified using the previously described masks which define an appropriate intensity for different areas of the image.

The watermarking operation proceeds as shown in FIG. 3. Each pixel in each square of the image is changed by an amount which depends both on the value specified for the corresponding pixel in the payload tile and by an intensity value. The intensity value is determined by looking at a series of masks. Each mask specifies a particular intensity. If the mask has an image at the location of the corresponding pixel, the intensity associated with that mask will control the intensity of the change.

The masks are ordered (with the mask specifying areas with the least intensity first) and if two masks have images at the same location, the first mask in the series controls the intensity of the pixels. The payload tile includes a value for each pixel in a square on the image. Each pixel in each square of the image is changed by an amount that depends both on the value specified by the associated pixel in the payload tile and by the various masks that define areas of the image to be watermarked at various intensities. The intensity that should be associated with a mask for an area having a particular width index can be determined by trial and error. However, once determined this value can be used for subsequent operations. That is, the shape of the masks for different images will vary according to the characteristics of the image. The intensity value assigned to a mask which represents an area having a particular width index can be the same for different images.

Figure 4:
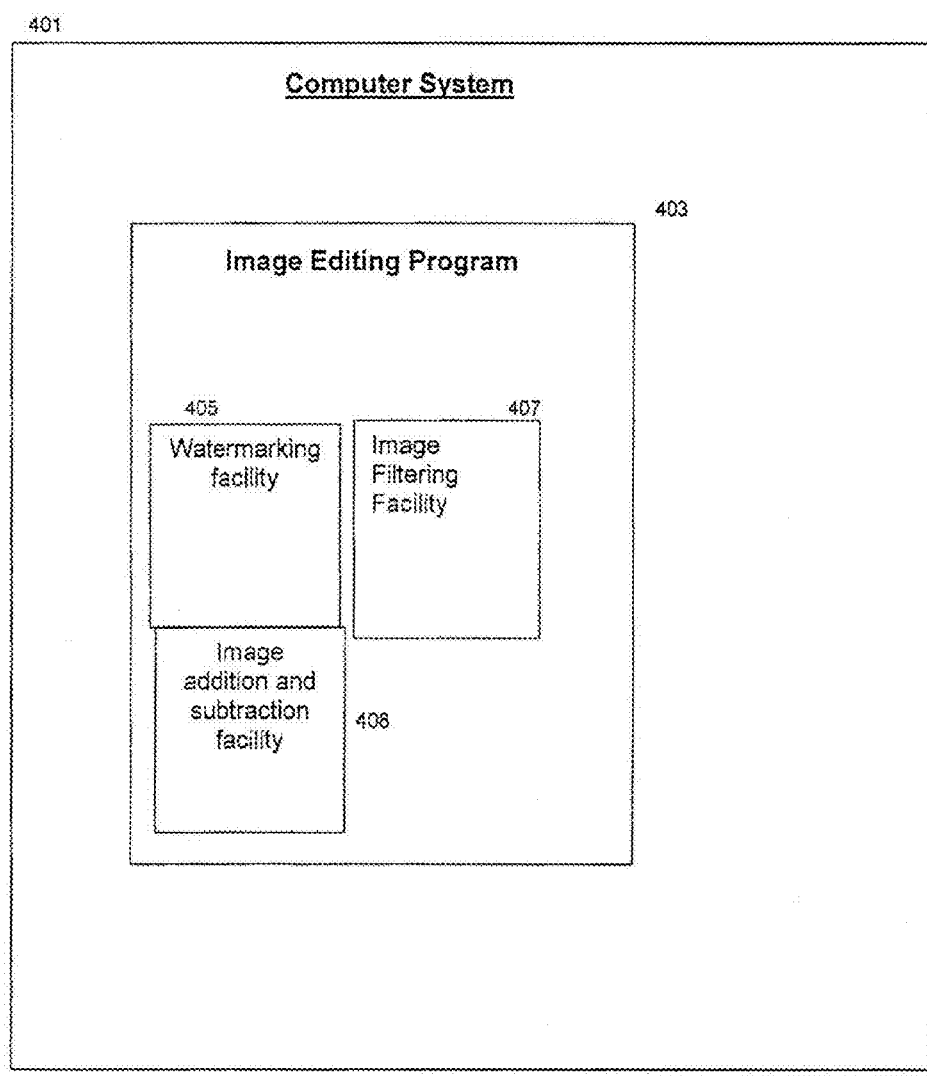
FIG. 4 shows a computer with the programs used to practice one embodiment of the present technology.

A system for performing the above described operations is shown in FIG. 4. The system includes a conventional personal computer system 401. This can for example be an Intel Pentium III system operating under the Microsoft Windows operating system. The computer system 401 includes conventional I-O devices such as a display, a keyboard, a printer, etc., conventional storage devices such as RAM, hard drive, CD drive etc. Such conventional components are not shown in FIG. 4.

The system includes an image editing program 403 such as for example the Adobe Photoshop image editing program. The image editing program 403 includes an image watermarking facility 405, an image filtering facility 407, and an image addition and subtraction facility 408. Except for the details described herein, the image editing program 403, the watermarking facility 405, the filtering facility 407, and the image addition and subtraction facility 408 are conventional components.

Figure 5:
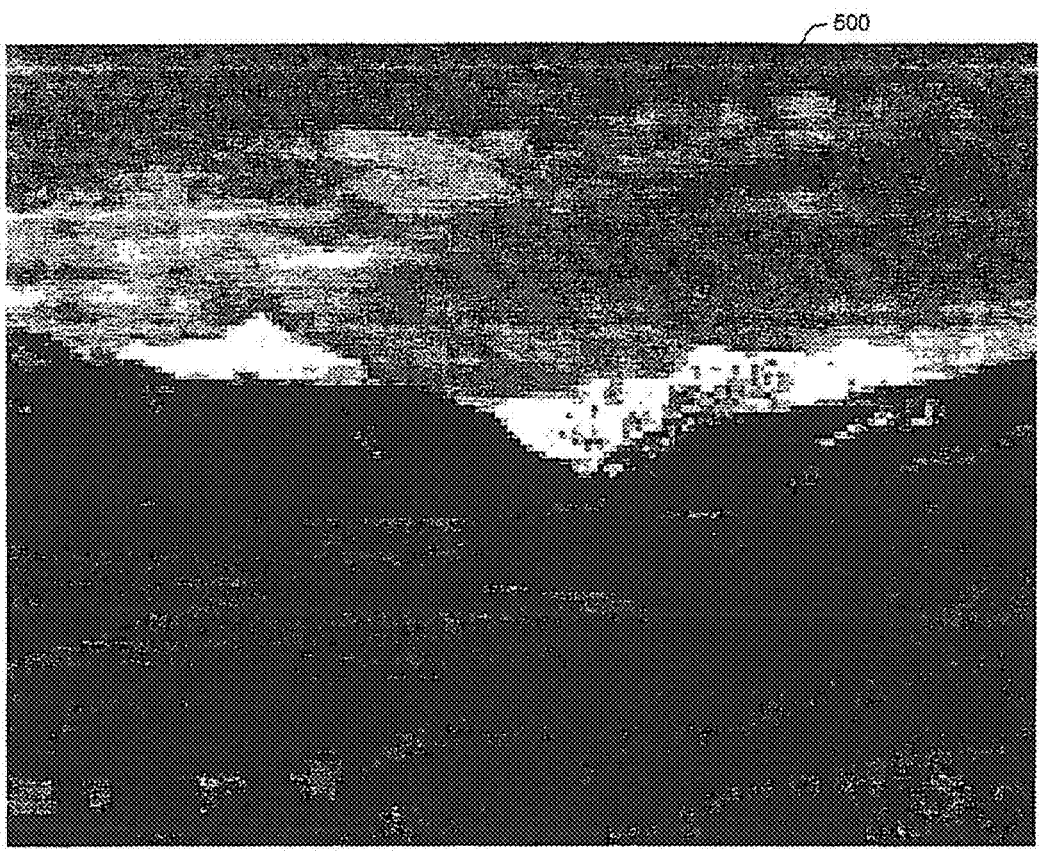
FIG. 5 is an example of a gray scale image.

The embodiment described above applied a watermark to an image that consisted of a series of lines with different width. The embodiment described below applies the technology to a half tone image such as that shown in FIG. 5. The half tone image shown in FIG. 5 is a conventional halftone image. It can, for example, be a single color channel of a multicolor image.

Figure 6:
FIG. 6 is an example of a line art image where the binary elements are lines.

Halftone images, such as image 500 shown in FIG. 5, can be transformed into line art images such as line art image 601 shown in FIG. 6. This conversion can be done by conventional, well knows processes regularly used in the printing industry. After a half tone image such as image 500 shown in FIG. 5 is converted to a line art image such as image 601 shown in FIG. 6, the technology can be applied as previously explained with respect to the first embodiment. That is, image 601 shown in FIG. 6 can be divided into areas, each of which has lines the width of which falls in a particular range. This can be done as previously explained by applying line width filters and subtracting from the original image to form a series of masks, each of which define an area with lines whose width fall within a selected or specified range.

After the areas with lines of similar width are defined as described above, the image is watermarked. As in the first embodiment, the intensity at each location in the image is defined by both the payload tile and the masks which define the area having line width in a specified range.

The line art image 601 shown in FIG. 6 appears as a series of lines. As is well known in the printing art, the elements in a line art image need not be lines. The elements in the line art image can be circles as in image 701 shown in FIG. 7. The particular shape of the elements is generally selected for various esthetic reasons and the present technology can be used with elements having any desired shape. The filtering to define areas having the same tonal density would proceed as previously described irrespective of the shape of the elements in the line art image.

Figure 7:
FIG. 7 is an example of a line art image where the binary elements are circles.

It should be understood that the images shown in FIGS. 5, 6 and 7 are merely representative of gray scale images. The present technology can be applied to gray scale images developed with any of the processes known in the printing industry.

Digital images consist of an array of bits or pixels. With the present technology, the bits or pixels in an image are divided in two ways. First the bits or pixels of an image are divided into arrays the size of a watermark payload tile as is conventional. Second the pixels of the image are divided into what can be termed secondary control areas.

The first division of the pixels or bits is into areas that are identical in size. That is, the first division divides the pixels into areas each of which is the size of the payload tile. The payload tile specifies the change in each bit or pixel in an area the size of said payload tile.

The amount specified by the values in said payload tile is the amount which is appropriate for the watermark to carry the desired payload data. The values in the payload tile can be established and used on a perceptually adaptive basis.

The secondary control areas are not necessarily identical in size. Furthermore, the size of the secondary control areas is not related to the size of the watermark tile. The secondary control areas are areas of the image which have some particular characteristic. For example they are areas of the image which have lines within a specified width range or areas which have tonal density values within a specified range.

Each secondary control area has an associated control value. For example the control value associated with each secondary control area can be the intensity of the watermark which is appropriate for the particular area.

The embodiments described herein give specific and novel techniques for dividing an image into secondary control areas. It should however, be understood that various other and different techniques can be utilized to define secondary control area for a document.

While our technology has been illustrated above with respect to various embodiments, it will be appreciated by those skilled in the art that that the scope thereof exceeds the specific embodiments described herein. Various other changes in form and detail can be made without departing from the sprit and scope of our inventive work.

We claim:

1. An article of manufacture including a non-transitory computer-readable medium having instructions stored thereon that, if executed by a computing device, cause the computing device to encode a digital watermark within two-dimensional imagery to convey plural-bit payload data, by performing operations including:
   designate a first multi-dimensional region within the imagery and encoding plural-bit payload data in the first multi-dimensional region at a first intensity;
   designate a second multi-dimensional region within the imagery, and encoding plural-bit payload data in the second multi-dimensional region at a second intensity;
   wherein the second multi-dimensional region has a non-rectangular shape that is different than a shape of the first region.

2. The article of claim 1 in which said instructions, if executed by the computing device, cause the computing device to perform operations including encoding all of said plural-bit payload data in the first multi-dimensional region, and also encoding all of said plural-bit payload data in the second multi-dimensional region.

3. The article of claim 1 wherein the image is a halftone image, and the instructions, if executed by the computing device, cause the computing device to perform operations further including:
   converting the half tone image into a line art image;
   filtering said line art image to create a series of masks defining areas of said half tone image having tonal density within a specified range, each range of tonal densities having an appropriate watermark intensity; and
   encoding the plural-bit payload data in the image, with the intensity of the encoded payload data being set to said appropriate watermark intensity.

4. A system including an input device, an output device, a processor, and the article of manufacture of claim 1 having said instructions stored therein, said instructions configuring the system to perform said operations.

5. An article of manufacture including a non-transitory computer-readable medium having instructions stored thereon for causing a computing device to encode a digital watermark within imagery to convey N-bits of auxiliary data, where N is larger than three, the imagery comprising image features that vary across the imagery, by performing operations including:
   establishing a first multi-dimensional region within the imagery by reference to image features within the first multi-dimensional region;
   encoding all N-bits of the auxiliary data in the first multi-dimensional region at a first intensity;
   establishing a second multi-dimensional region within the imagery by reference to image features within the second multi-dimensional region; and
   encoding all N-bits of the auxiliary data in the second multi-dimensional region at a second, different intensity.

6. A system including an input device, an output device, a processor, and the article of manufacture claim 5 having said instructions stored therein, said instructions configuring the system to perform said operations.

7. A system comprising:
   memory storing an image editing program;
   an input for receiving imagery;
   means for encoding 2-dimensional payload data at a first intensity in a first multi-dimensional region within the imagery; and
   means for encoding the 2-dimensional payload data at a second intensity in a second multi-dimensional region within the imagery,
   in which the second multi-dimensional region has a non-rectangular shape that is different than a shape of the first multi-dimensional region.

8. The system of claim 7 in which the imagery comprises a halftone image, wherein said system further comprises:
   means for converting the half tone image into a line art image;
   means for filtering the line art image to create a series of masks defining areas of the half tone image, each of the areas having a tonal density within a range, each range of tonal densities having an associated watermark intensity; and means for encoding the 2-dimensional payload data in the areas of the half tone image, with an intensity of encoding per respective area being set according to its associated watermark intensity.

9. A system comprising:
memory storing an image editing program;
an input for receiving imagery, the imagery comprising image features that vary across the imagery;
means for encoding 2-dimensional auxiliary data at a first intensity within a first multi-dimensional region within the imagery, in which the first multi-dimensional region comprises a non-rectangular shape; and
means for encoding the 2-dimensional auxiliary data at a second, different intensity within a second multi-dimensional region within the imagery.

10. The system of claim 9 further comprising means for determining the first multi-dimensional region by reference to image features within the first multi-dimensional region.

11. The system of claim 10 further comprising means for determining the second multi-dimensional region within the imagery by reference to image features within the second multi-dimensional region.

12. The system of claim 9 in which the imagery comprises multi-color imagery, and the first multi-dimensional region is carried in a first color channel of the multi-color imagery.

13. The system of claim 9 in which the second multi-dimensional region comprises a non-rectangular shape.

14. An apparatus comprising:
memory storing an image editing program;
an input for receiving imagery;
a processor configured for:
encoding plural-bit payload data at a first intensity in a first multi-dimensional region within the imagery; and
encoding the plural-bit payload data at a second intensity in a second multi-dimensional region within the imagery,
in which the second multi-dimensional region has a non-rectangular shape that is different than a shape of the first multi-dimensional region.

15. The apparatus of claim 14 in which the imagery comprises a halftone image, wherein said processor is configured for:
converting the half tone image into a line art image;
filtering the line art image to create a series of masks defining areas of the half tone image, each of the areas having a tonal density within a range, each range of tonal densities having an associated watermark intensity; and
encoding the plural-bit payload data in the areas of the half tone image, with an intensity of encoding per respective area being set according to its associated watermark intensity.

16. An apparatus comprising:
memory storing an image editing program;
an input for receiving imagery, the imagery comprising image features that vary across the imagery;
a processor configured for:
encoding a pattern of 2-dimensional auxiliary data at a first intensity within a first multi-dimensional region within the imagery, in which the first multi-dimensional region comprises a non-rectangular shape; and
encoding the pattern of 2-dimensional auxiliary data at a second, different intensity within a second multi-dimensional region within the imagery.

17. The apparatus of claim 16 in which said processor is configured for determining the first multi-dimensional region by reference to image features within the first multi-dimensional region.

18. The apparatus of claim 17 in which said processor is configured for determining the second multi-dimensional region within the imagery by reference to image features within the second multi-dimensional region.

19. The apparatus of claim 16 in which the imagery comprises multi-color imagery, and the first multi-dimensional region is carried in a first color channel of the multi-color imagery.

20. The apparatus of claim 16 in which the second multi-dimensional region comprises a non-rectangular shape.

21. The apparatus of claim 16 in which imagery within the first multi-dimensional region comprises a plurality of pixels, with each pixel of the plurality of pixels being changed according to both an associated value of the plural-bit payload data and by the first intensity.

22. The apparatus of claim 21 in which the first intensity is determined by an image mask.

23. The apparatus of claim 16 in which the imagery represents gray scale imagery.

24. The apparatus of claim 14 in which imagery within the first multi-dimensional region comprises a plurality of pixels, with each pixel of the plurality of pixels being changed according to both an associated value of the auxiliary data and by the first intensity.

25. The apparatus of claim 24 in which the first intensity is determined by an image mask.

26. The apparatus of claim 14 in which the imagery represents gray scale imagery.

27. The system of claim 7 in which imagery within the first multi-dimensional region comprises a plurality of pixels, with each pixel of the plurality of pixels being changed according to both an associated value of the 2-dimensional payload data and by the first intensity.

28. The system of claim 27 in which the first intensity is determined by an image mask.

29. The system of claim 7 in which the imagery represents gray scale imagery.

30. The system of claim 9 in which imagery within the first multi-dimensional region comprises a plurality of pixels, with each pixel of the plurality of pixels being changed according to both an associated value of the 2-dimensional auxiliary data and by the first intensity.

31. The system of claim 30 in which the first intensity is determined by an image mask.

32. The system of claim 9 in which the imagery represents gray scale imagery.

33. The article of manufacture of claim 5 in which the image features within the first region comprise a tonal density within a predetermined range.

34. The system of claim 10 in which the image features within the first multi-dimensional region comprise a tonal density within a predetermined range.

* * * * *